United States Patent [19]
Latter

[11] Patent Number: 5,885,411
[45] Date of Patent: *Mar. 23, 1999

[54] MODULAR SEALING MACHINE

[76] Inventor: Melvin R. Latter, c/o M. Latter Mfg., Inc. 3669 7th Ave., Los Angeles, Calif. 90018

[ * ] Notice: The term of this patent shall not extend beyond the expiration date of Pat. No. 5,705,026.

[21] Appl. No.: 843,268

[22] Filed: Apr. 14, 1997

Related U.S. Application Data

[63] Continuation-in-part of Ser. No. 419,997, Apr. 10, 1995, Pat. No. 5,705,026.

[51] Int. Cl.⁶ ..................................................... B32B 31/20
[52] U.S. Cl. .................. 156/583.9; 156/515; 156/583.2; 156/583.8; 493/189; 493/209
[58] Field of Search ..................................... 156/515, 580, 156/583.1, 583.2, 583.8, 583.9, 583.91; 493/189, 209; 100/233

[56] References Cited

U.S. PATENT DOCUMENTS

| | | | |
|---|---|---|---|
| 4,184,587 | 1/1980 | Hallstrom | 198/750.2 |
| 4,333,297 | 6/1982 | Kuttenbaum | 53/252 |
| 4,351,692 | 9/1982 | Oullette | 156/443 |
| 4,447,284 | 5/1984 | Shanklin | 156/366 |
| 4,589,948 | 5/1986 | Held | 156/555 |
| 4,640,734 | 2/1987 | Roberts et al. | 156/562 |
| 4,643,296 | 2/1987 | Braun | 198/735 |
| 4,650,535 | 3/1987 | Bennett | 156/352 |
| 4,723,484 | 2/1988 | Held | 100/38 |
| 4,822,447 | 4/1989 | Obermeier | 156/538 |
| 4,829,751 | 5/1989 | Tisma | 53/575 |
| 4,939,889 | 7/1990 | Watanabe | 53/450 |
| 4,945,712 | 8/1990 | Bennett | 53/555 |
| 4,982,556 | 1/1991 | Tisma | 53/506 |
| 5,070,681 | 12/1991 | Romagnoli | 53/566 |
| 5,157,896 | 10/1992 | Tisma | 53/252 |
| 5,177,931 | 1/1993 | Latter | 53/133.3 |
| 5,198,056 | 3/1993 | Stockli | 156/73.1 |
| 5,253,748 | 10/1993 | Ledet | 198/834 |
| 5,324,385 | 6/1994 | Bennett | 156/583.1 |
| 5,350,348 | 9/1994 | Guot | 493/34 |
| 5,480,509 | 1/1996 | Matsuo | 156/522 |
| 5,705,026 | 1/1998 | Latter | 156/583.9 |

Primary Examiner—James Sells
Attorney, Agent, or Firm—Ladas & Parry

[57] ABSTRACT

Disclosed in this description is a shrink wrap machine in which the majority of the machine's major components are modularly, and therefore detachably attached. The shrink wrap machine uses a counterweight on its sealing arm to bias the position and damp the motion of the arm.

57 Claims, 9 Drawing Sheets

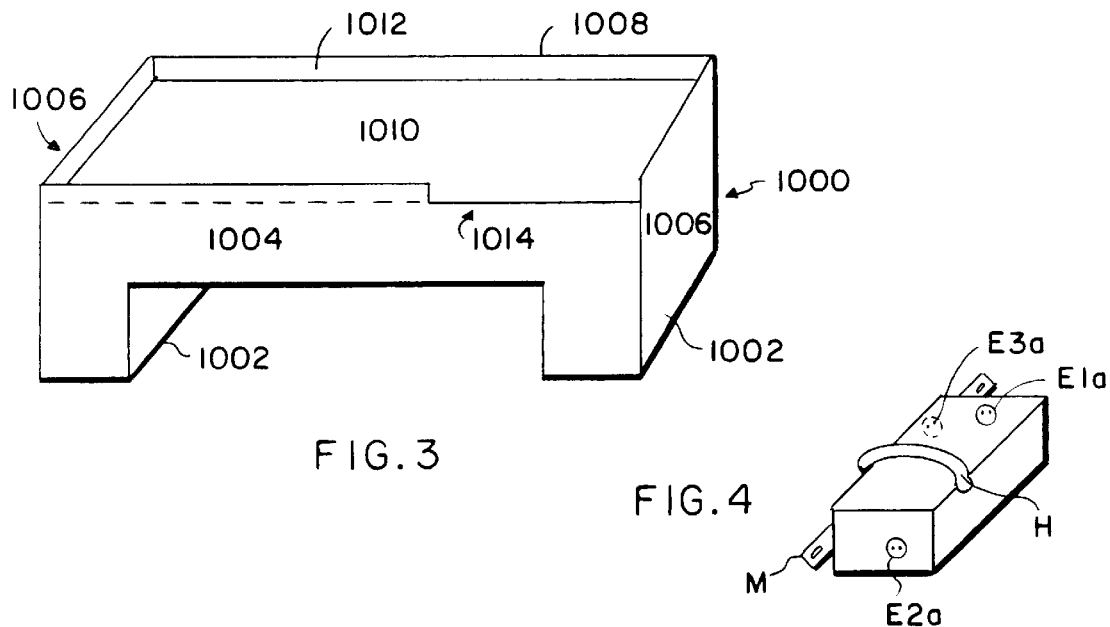
FIG. 3
FIG. 4
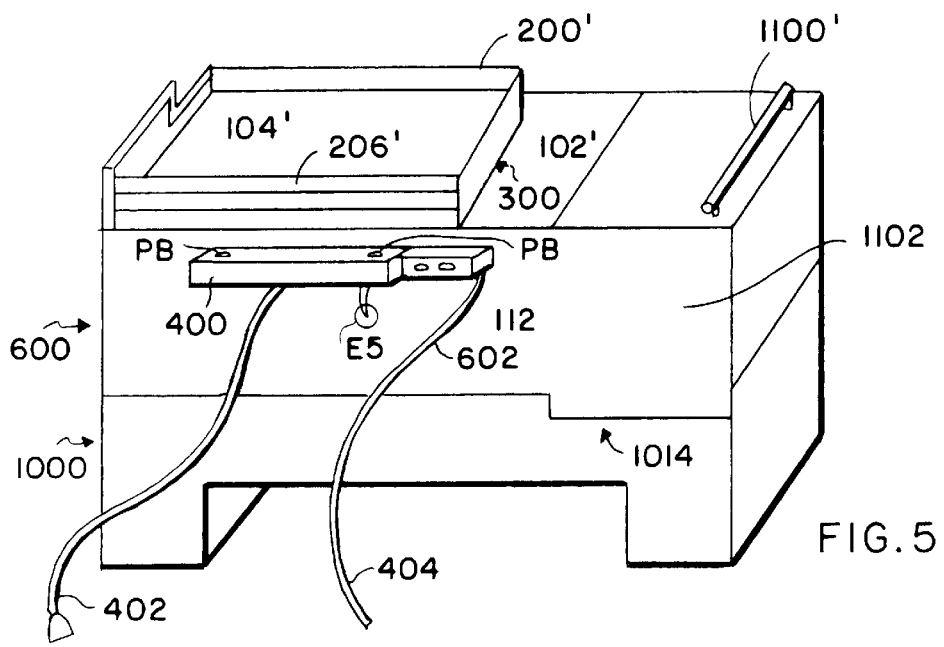
FIG. 5
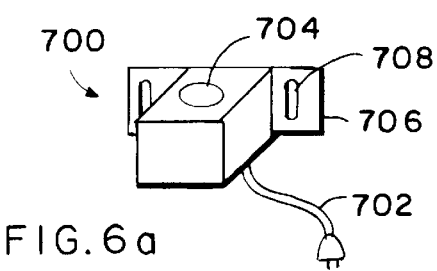
FIG. 6a

MODULAR SEALING MACHINE

CROSS REFERENCE TO RELATED APPLICATIONS

This is a continuation-in-part of U.S. Ser. No. 08/419,997 (now U.S. Pat. No. 5,705,026), filed on Apr. 10, 1995 and incorporated herein by reference.

BACKGROUND OF THE INVENTION

Known in the art are sealing machines for sealing plastic wrap around products. These machines can be purchased in various models and are known in the trade as "shrink-wrap" machines or "L Sealers". The letter "L", is used to refer to the general configuration of a heating element in an arm that is pivotally attached to the machine. A product or item to be packaged is placed in a sheet of plastic that has been folded in half. The product therefore lies inside the folded plastic sheet such that it is between the two sheets of plastic formed by the folding of the one sheet of plastic against itself. The arm is then brought down around the product and onto the plastic sheets to melt the sheets together under the heating element and around the product. This places the product in an envelope of plastic. The envelope of plastic and product is then passed into a heating unit which causes the plastic to "shrink" around the product and thereby seal it in the plastic. The product has been in this fashion, "shrink-wrapped" in plastic.

Some L sealer machine models are largely mechanically operable, with the sealing arm being pivotally attached to the body and electrically hard-wired into the machine. The arm may be manually pivoted up and down with respect to the machine top surface. Manually lifting and lowering the arm can become quite strenuous if the machine is used for a long period of time to seal plastic around a number of items independently. Thus, if the user of the machine can afford a more costly and complex machine, a further model may be ordered in which the arm is pneumatically and/or electro-magnetically controlled to reduce the physical strain on the operator in continuously lifting and lowering the arm. In such a case, the pneumatic and/or magnetic means are hard-wired and permanently welded into the machine body. They are, therefore, considered to be integrally connected to the machine.

L Sealers may be ordered with any one of the foregoing features and with a permanently attached, integral, conveyor system which conveys articles which have been sealed in the plastic by the sealing arm away from the machine. The machine may be also ordered with an automatic arm control. Again, this feature is a permanent installation in the machine. The machine may be ordered as well, with an automatic plastic feeder unit for feeding the plastic through the machine for sealing around the item. This unit is again a permanent and integral portion of the machine and is hard-wired into the electrical system of the machine.

Since L Sealer machines are relatively expensive, a small company will usually first order a manually operable machine. As the company grows, it will usually then invest in a second machine that is equipped with the magnetic or pneumatic means and perhaps as well with the conveyor. Finally, it may purchase as a third machine, a fully automatic machine. Each additional feature adds to the price of the machine and the machine cannot be changed to later delete or add parts. Accordingly, the user cannot turn a manual machine into an automatic machine or vice versa.

The technology for providing the heating elements in the sealing arm with electric current so that the arm acts as a hot sealer frame, the technology for pneumatic and magnetic controls, and the technology for automated machines, feeders and conveyors, are all well established in the art and of a reliable and permanent nature in quality machines. Thus, the well-constructed L Sealer sealing machines of the prior art are usually durable with all parts firmly attached, as by welding and hard wiring, and not readily disconnected. These machines provide to the purchaser a machine with a long useful life requiring minimal reasonable upkeep. These features are all desirable if the model machine purchased is the model one wishes to use for the next 25 years. The features of integral manufacture of all parts, firm welded attachments and hard wiring are not entirely satisfactory if one wishes an upgraded or downgraded machine over the years due to a change in business. For that party, different machines must be purchased over the life of the business to accommodate the needs of the business. The end result is a significant outlay in monies for a stock of machines which is comprised of only a portion that meets the needs of the company at a given point in time.

The present invention attempts to resolve this problem by offering to the purchaser a modular machine. With the present invention, a base frame or machine may be purchased. As investment monies become available, the originally-purchased base machine may be readily upgraded rather than having to purchase a second upgraded machine. By way of example and not limitation, the base machine of the invention may be augmented by the addition of pneumatic, electromagnetic, and automatic arm and feed means as well as conveyors, stands, counterweights and any other parts available at the time for addition to the machine. Further, with the present machine, if a portion of the machine fails, it may be readily detached and replaced with a replacement portion. This enables repair or disposal of the failed part. The inventor is unaware of any prior art sealing machine in which the major parts may be modularly attached and detached and which parts are functioning useful units separate from the machine.

Another aspect of the present invention is to resolve in a new manner, the issue of operator and machine stress in having to bring upwardly and downwardly the sealing arm in serially sealing plastic around items. This is accomplished by employing a counterweight on the sealing arm to bias it to a desired position.

SUMMARY OF THE INVENTION

Disclosed herein is a modularly connected shrink wrap machine wherein a majority of its parts are detachably connected within the machine. In this machine, the major components are detachably connected rather than welded and hard wired together.

Disclosed herein is a shrink wrap machine having at least one of: a detachably connected arm; a detachably connected automatic scissor jack; a detachably connected automatic conveyor; a detachably connected pneumatic device; a detachably connected magnetic device; a detachably connected power and electrical supply.

More narrowly, disclosed herein is a modular sealing machine wherein at least any one of or all of the following may be readily added to or detached from the base frame unit: electrical unit, stand, sealing arm with heating element, pneumatic means, magnetic means, conveyor means, automatic arm means, automatic feed means, plastic feeder, counterweight.

The present invention is a sealing machine comprised of readily detachable parts, the parts being independently operable. The present invention is comprised of a plurality of separable units which are detachably connected to one another to form one integrally operable unit.

Disclosed herein is a machine comprised of:

a base;

a frame pivotally attached to the base for movement away and toward the base;

a counterweight pivotally attached to the base, the counterweight defining an opening therein;

a sliding extension attached to the frame and passing through the opening in the counterweight, the sliding extension being situated in the opening so as to rub against a portion of the counterweight forming the opening, such that upon movement of the frame, the counterweight moves on the sliding extension, the rubbing between the sliding extension and the counterweight having a damping effect on the movement of the counterweight on the sliding extension.

The disclosure herein includes a sealing system for sealing plastic wrap around an item, the system comprising:

a base unit;

electrical components in the base unit for controlling and powering the system;

an electrically powered hot sealing frame for sealing a first layer of plastic wrap and a second layer of plastic together, the sealing frame being pivotally attached to the base unit and having a back portion and an elongated heated portion extending from the back portion to define a side portion and a front portion, wherein the elongated heated portion contacts the first layer of plastic wrap so that the first layer of plastic wrap melts to the second layer of plastic wrap under the elongated heated portion, an extension extending from the back portion of the sealing frame;

a counterweight frictionally and slidably mounted on the extension and pivotally mounted to the base unit such that when the frame is pivoted away from the base unit, the counterweight slides on the extension toward the base unit and when the frame is pivoted toward the base unit, the counterweight moves on the extension away from the base unit, the friction slowing the movement of the sealing frame as it pivots toward and away from the base unit.

In the foregoing, the extension is a surface of a first texture in the area where the counterweight will slide, and the counterweight is a surface of a second texture in the area which contacts the extension, so that the movement between the counterweight and the extension is damped.

In the foregoing the counterweight in the area where it slides on the extension is of a first material and the extension in the area where the counterweight will slide is made of a second material different from the first material so that the movement between the counterweight and the extension is damped.

Disclosed herein is also a modular sealing system for sealing plastic wrap around an item, the system comprising:

a base unit;

electrical components in the base unit for controlling and powering the system;

an electrically powered hot sealing frame for sealing a first layer of plastic wrap and a second layer of plastic together, the sealing frame being pivotally attached to the base unit and having a back portion and an elongated heated portion extending from the back portion to define a side portion and a front portion, wherein the elongated heated portion contacts the first layer of plastic wrap so that the first layer of plastic wrap melts to the second layer of plastic wrap under the elongated heated portion; the system being detachably connectable to at least one of: an electrically operable pneumatic sealing system, an electrically operable magnetic sealing system.

Also disclosed herein is a modular sealing system for sealing plastic wrap around an item, the system comprising:

a base unit;

electrical components in the base unit for controlling and powering the system;

an electrically powered hot sealing frame for sealing a first layer of plastic wrap and a second layer of plastic together, the sealing frame being pivotally attached to the base unit and having a back portion and an elongated heated portion extending from the back portion to define a side portion and a front portion, wherein the elongated heated portion contacts the first layer of plastic wrap so that the first layer of plastic wrap melts to the second layer of plastic wrap under the elongated heated portion; the system being detachably connectable by detachable fastening or association to an electrically operable scissor jack, an electrically operable plastic feeder, an electrically operable conveyor, a manually operable scissor jack, a manually operable plastic feeder, a manually operable conveyor.

DRAWINGS

The present invention will be better understood with reference to the following drawings. These drawings are intended to be examples of possible embodiments of the invention and are not intended to act as a limitation of the invention. The drawings are not necessarily drawn to scale.

FIG. 3 is perspective view of a stand on which the base unit may be placed.

FIG. 4 is a perspective view of an electrical component box which may be placed in the electrical compartment of the base unit of FIG. 2.

FIG. 5 is a front view of the base unit of FIG. 2 with the pneumatic means and sealing arm attached and with the base unit situated in a support structure for use while standing.

FIG. 6a is a front perspective view of a modular electro-magnetic means for use with a sealing arm of the invention.

FIG. 6b is a modified sealing arm for use with the magnetic means of FIG. 6a.

DETAILED DESCRIPTION OF THE INVENTION

Figure 1:
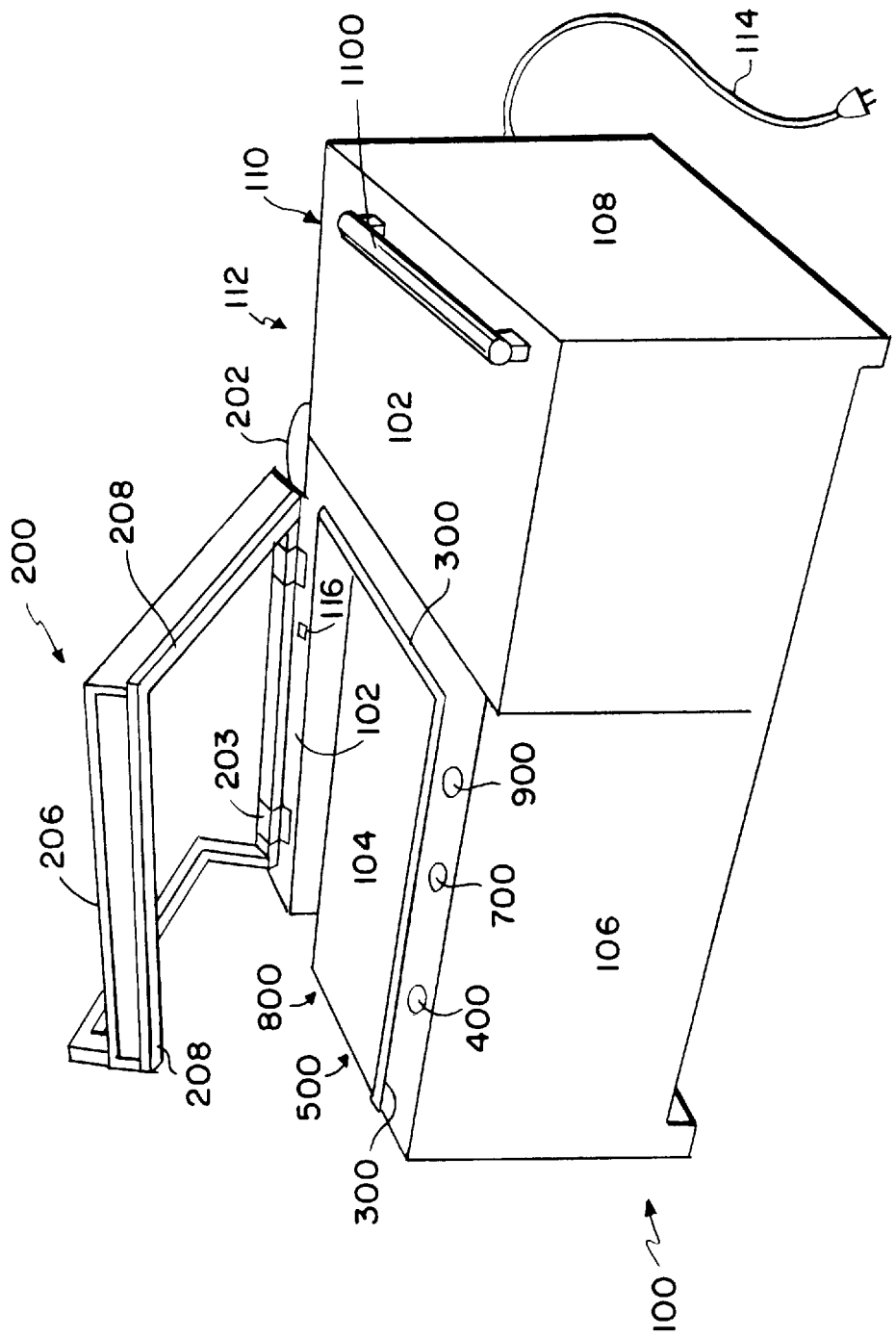
FIG. 1 is a perspective view of a prior art device.

FIG. 1 is a perspective, somewhat diagrammatic view of a prior art L sealing machine (100) such as described in U.S. Pat. Nos. 4,650,535 or 5,324,385. Both of these patents describe inventions of Charles J. Bennett. These patents are incorporated herein by reference.

In FIG. 1, the machine (100) has a top surface (102) which forms a plane on one half, and opens on the other half to expose a work surface (104). Work surface (104) may represent the top of a permanently, built-in conveyor (500), or merely a further surface which may be the top of a permanently, built-in scissor jack. If the surface is a conveyor (500), then work surface (104) is mobile to carry work products away from top surface (102).

Connected at right angles to top surface (102) is front face (106). Extending at right angles from top surface (102) and front face (106), is a side end face (108). Not shown, but extending parallel to front face (106) and at right angles to top surface (102) and side end face (108), is back face (110).

A hot sealing frame (200) is connected permanently at its back portion, to machine (100) by wire (202) and hinges (203). Hinges (203) attach to top surface (102) in the area of work surface (104) so that frame (200) may be moved with respect to top surface (102). A pad or pads (300) extend partially around work surface (104) and connect to top surface (102). These pads (300), interact with a heating element or electrical wire (208) which passes along a portion of hot sealer frame (200) and connects to wire (202). Heating element or electrical wire (208) lies in the generally L configuration discussed above. Pads (300) also have this configuration. Pads (300) are removably attached to top surface (102) for replacement due to wear.

Handle (206), which is part of frame (200) and extends therefrom, is generally heat isolated from heating element (208) and enables the user of the machine (100) to bring hot sealing frame (200) toward and away from pad (300).

Figure 10:
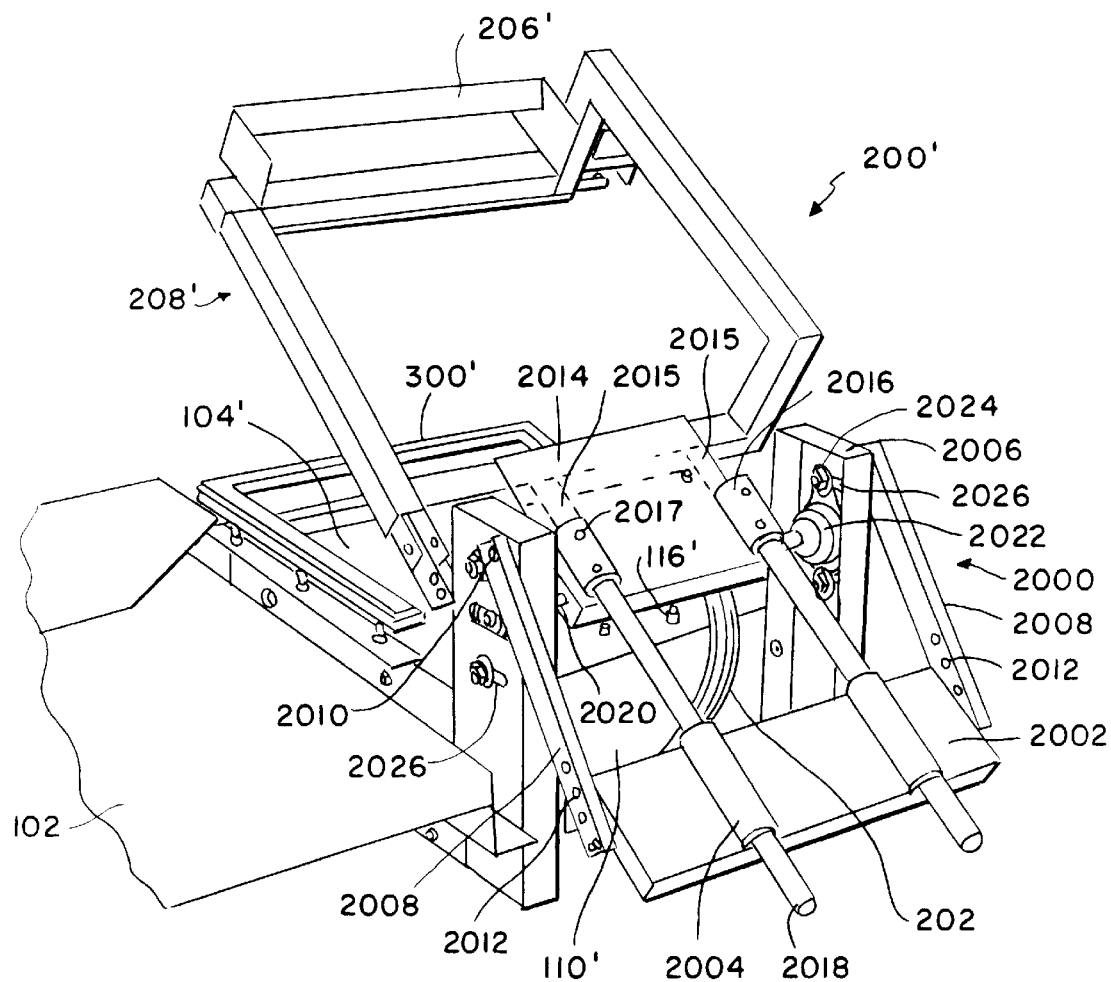
FIG. 10 is a perspective view of an L sealer with a friction-controlled counterweight attached to it.

A switch (116), extends through top surface (102) to abut hot sealing frame (200), or a surface extending therefrom, when frame (200) is in a certain position. (The use of a surface extension is shown in FIG. 10 as plate (2014).) Heating elements and electrical wires (208) and wire (202) interconnect with switch (116). When switch (116) is in one position, as when frame (200) depresses it, electricity passes into heating element (208). When switch (116) is in another position, as when frame (200) no longer contacts it and it is not depressed, electricity is blocked from passing through heating element (208). By bringing frame (200) against pads (300), switch (116) is depressed and electricity passes from wire (202) into heating element (208) enabling the frame (200) to apply heat against pads (300).

Roller (1100), mounted on the top of top surface (102) and away from work surface (104), holds a plastic film that is folded to comprise two layers. This film is brought across pads (300) and work surface (104). An item to be sealed in the plastic is placed between the two layers on work surface (104). Then hot sealing frame (200) is brought down against the plastic and pads (300) to seal the item in the plastic. Heat emanating from heating element (208) causes the plastic layers to melt to each other and ultimately, with enough heat, sever along the line defined by heating element (208).

The FIG. 1 prior art drawing, shows in diagrammatic form, that machine (100) has been produced with pneumatic (400) and/or electric magnetic means (700) as well as automatic means (900) and conveyor (500). These means are all permanently installed so that once the machine is powered, all services become available and are operable. The means are not detachable connected within the machine. They are hard wired, welded and made integral with the machine. Accordingly, and as understood by those skilled in the art but not specifically shown, pneumatic (400) and magnetic (700) means operate with hot sealing frame (200). Automatic means (900) also operate with hot sealing frame (200), as well as roller (1100) and conveyor (500). Pneumatic means (400) will automatically and in timed sequence, bring the heating arm (200) up from and down against pads (300) and facilitate the amount of pressure exerted by hot sealing frame (200) against pads (300). Magnetic means (700) further acts to hold hot sealing frame (200) against pads (300) for a selected time and to facilitate the amount of pressure with which hot sealing frame (200) is held against pads (300). In coordination with the lifting of hot sealing frame (200) away from pads (300), conveyor (500) will be operated to carry goods sealed in plastic on work surface (104) off of work surface (104). Then more plastic will be fed onto pads (300) and work surface (104) for placement of an item therein and sealing of the plastic film thereabout.

Within machine (100), are electrical connections, motors and the like to enable conveyor (500), pneumatic (400) and/or magnetic (700) devices, hot sealing frame (200) and any other devices to operate. These devices are ultimately provided power by their connection to electrical cord (114) which extends from machine (100) and may be plugged into an electrical outlet. These devices are all permanent and integral connections of machine (100). With the exception of pads (300), which are readily removable, one may not easily separate pneumatic means (400), magnetic means (700), hot sealing frame (200) or any of the other parts from machine (100). These parts are permanently affixed to machine (100) by welding, hard-wiring and otherwise.

Figure 2:
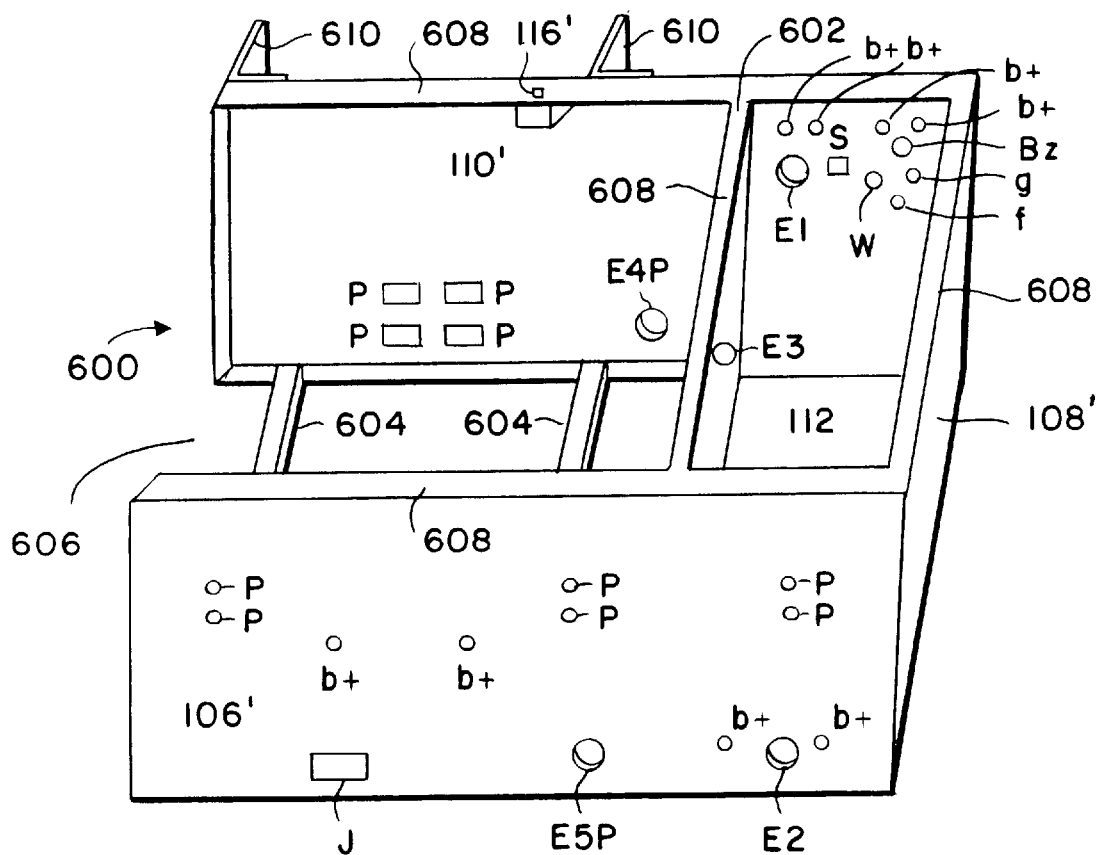
FIG. 2 is a perspective view of the base unit of the invention.

The following figures disclose one embodiment of a method of making all of the above features as well as others, modular. That is readily separable and detachable from the base machine. The inventor has made all of the units as separately functional devices. However, these devices may be detachably connected to a base unit to work as an integrated unit. Such detachable connections may merely require the use of bolts and washers for mounting the means and a simple electrical connection, such as a plug, for powering the means. Thus, the party who can only afford a manual machine in the beginning, may readily upgrade that machine as finances permit. Further, should, at some point, a less sophisticated machine be desired, the machine may again be reduced to a more basic unit. Turning then to FIG. 2 with reference to the other figures, the base unit (600) of this invention is shown. To the extent that base unit (600) shares features from the prior art drawing of FIG. 1, like reference numerals are used distinguished only by a "prime" notation.

In FIG. 2, a front face (106') connects at right angles to a side end face (108') which connects at right angles to a back face (110'). A divider wall (602) extends between front face (106') and back face (110') and is situated parallel to and spaced from side end face (108'). With this construction, divider wall (602) and side end face (108') define therebetween a compartment (112). This compartment (112), is to house the electronics of the invention. These electronics may be held in a container that is detachably mounted in compartment (112) or hard wired directly into compartment (112). FIG. 4, shows a container of electronics which may be placed in compartment (112).

The top of base unit (600) is defined by lips or edges (608) which are defined on the front face (106'), side end face (108') and back face (110') as well as by the top edge of divider wall (602). To these edges or lips (608), top surface (102'), a piece of sheet metal sized to fit over compartment (112), may be bolted, hingedly connected, or otherwise removably attached. Pads (300) may then be detachably mounted to edges (608) and/or a portion of top surface (102') in an arrangement to interact with a hot sealing frame (200') as occurs in the prior art.

Extending between the lower portions of the front face (106') and the back face (110'), are two spaced-apart support bars (604). As is appreciated from FIG. 2, there is only one end connection between front face (106') and back face (110'). That is side end face (108'). The opposing end (606), has no end face. This causes base unit (600) to be open ended at end (606). It is between this open end (606) and divider wall (602) that support bars (604) are placed. Divider wall (602) defines on one side the area for work surface (104'). On its opposing side, it defines the area for compartment (112') over which top surface (102') is detachably, hingedly or slidably mounted. Extending from back face (110') of base unit (600), at open end (606) and near divider wall (602), are mounts (610). Mounts (610) are for adjustable and detachable connection to hot sealing frame (200'). In the drawings, mounts (610) are shown as L units welded to base unit (600).

Base unit (600) defines a plurality of openings in its surfaces to enable the easy bolting or detachably connecting to it of parts. Some of these openings are shown in FIG. 2. It is understood that additional openings may be added or openings may be omitted depending upon the ultimate goals of the manufacturer. In this latter regard, there could be openings in lips or edges (608) for detachably connecting top surface (102') to base unit (600). Top surface (102') would then have corresponding openings so a connecting device could be passed through the corresponding openings and be secured in place by nuts and washers if necessary. On the other hand, it may be preferred to connect top surface (102') to base unit (600) by hinges so that it may be readily lifted upwardly and downwardly to expose compartment (112). In such an instance, openings for hinge connections would need to be present.

Shown in back face (110'), in that portion which makes up one wall of compartment (112), are numerous openings. Opening f is to hold a fuse holder. Opening Bz and the surrounding openings bt are for mounting a buzzer unit known in the art. Openings bt are for holding bolts that would pass through a plate holding a buzzer unit that would be electrically connected into compartment (112). If the electrical components were contained in a modularly removable container such as shown in FIG. 4, these openings would be omitted and the fuse and buzzer would be held instead in that container. The container would be detachably mounted in compartment (112), as at wings M, by bolts or other securing devices passing through wings M, and a wall of compartment (112). Alternatively, the container could rest on additional support bars that would be added to the base of compartment (112).

Also included is an opening g for a ground connection. Opening W is to accommodate wires or a connector for a power connection. Electrical plug and cord (114) shown in FIG. 1, may pass through opening W to provide power for the connections held modularly or otherwise in compartment (112).

Opening S is for detachably connecting a hot hole puncher (not shown) to base unit (600). The hot hole puncher would be mounted detachably on hot sealing frame (200'). Opening S may merely contain a plug into which the hot hole puncher may be connected. Instead, a cold punch could be used, as known in the art. In such a situation, the connection held in opening S, while still being a plug, would connect into a timer mechanism. Alternatively, the cold punch may have its own sensor and timer mechanism and/or operate through switch (116'), as will, through the reading of later paragraphs herein, be better understood.

Opening E1 and closely adjacent bolt hole openings bt, are for the extension of wires or a plug for detachable connection to wire (202'), as shown in FIG. 1. Wire (202') is associated with hot sealing frame (200') and heating element or wire (208'), which passes through a portion of hot sealing frame (200'). Bolt holes bt, are to accommodate a plate which may have therein a strain relief for holding the electrical connection which detachably attaches to wire (202'). The connection and arrangement of these parts is to enable hot sealing frame (200') to be readily detached electrically and physically, from base unit (600). This is done by unplugging or unwiring sealing frame (200') from its connection through opening E1. One would do this to repair or replace frame (200'). The electrical connection made available through opening E1 may be held in a modular electrical unit mounted in compartment (112) which has electrical outlets in positions corresponding with the openings in base unit (600). This is seen to some degree by reviewing the modular unit in FIG. 4 and connections E1a, E2a, and E3a. These connections coordinate and cooperate with openings E1, E2, and E3 respectively in base unit (600). Handle (H) enables the ready positioning of the unit in compartment (112).

Opening E3, in divider wall (602), is fashioned to accommodate a plug, outlet or readily attachable electrical wires for connection into electrical compartment (112). These will be used to connect to conveyor (500') discussed in more detail in the following paragraphs. In a similar vein, opening E2 in front face (106'), which is located in the vicinity of compartment (112), is also sized to accommodate a plug, outlet or readily attachable electrical wires for connection to electromagnetic means (700'), discussed in more detail in later paragraphs. As with the other electrical attachments herein noted, these electrical attachments could instead be held in the modular unit of FIG. 4 which may be placed in compartment (112). In such an instance, the attachments would be situated in positions corresponding to openings E2 and E3.

Switch (116'), is a momentary switch known in the art. It is detachably located through an opening in lip (608) of back face (110') in the area where work surface (104') is placed. The wiring from switch (116') passes through an unseen opening in divider wall (602) for connection into the electrical means housed in compartment (112).

There is also an unshown opening in the area of compartment (112) for extension of an "off-on" switch to power the components held in compartment (112).

In summary, defined in the area of compartment (112), are openings for connecting means. These enable the detachable electrical connection of various different components to base unit (600) and the electrical and power components which may be modularly or permanently held in compartment (112). With the exception of the motor and mechanisms related to the hot sealing frame (200') and perhaps a central timer, compartment (112) acts as central power connection to which numerous independent units may be detachably connected as by plugs. This shall become more apparent from the following paragraphs.

In that portion of back face (110') which does not make up a portion of compartment (112), are additional openings or attachment means. These are associated with pneumatic means (400). The markings therefore, include the letter P and are marked as P and E4P. The four rectangular openings, P are for mounting a piston and reed switch.

Figure 9:
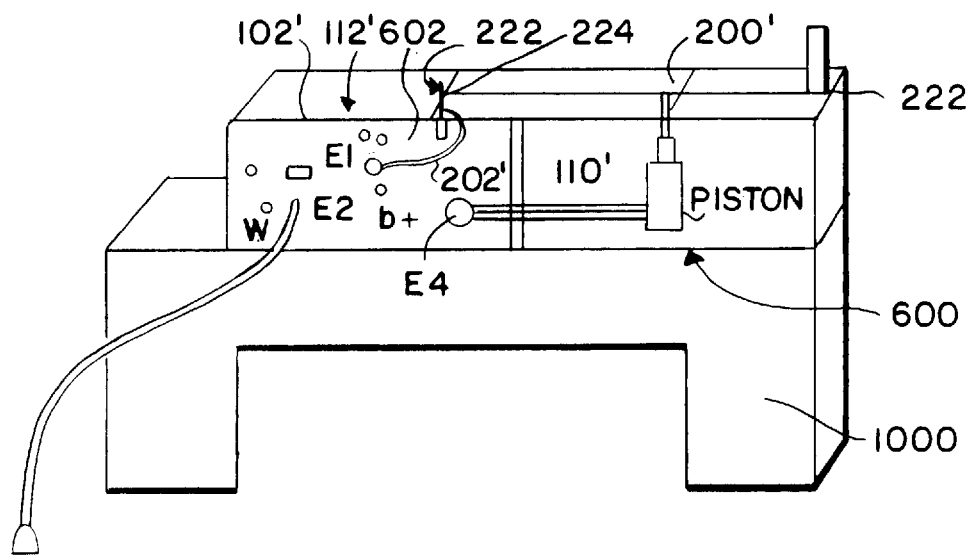
FIG. 9 is a back view of the FIG. 5 view with the plastic feeder removed.

One piston which may be used is made by the Bimba Company and reference is made to FIG. 9. There, the top plunger of the piston is detachably connected to the back of hot sealing frame (200'). The electrical connection from the piston and the air tube connection, pass from the piston through opening E4P into front opening E5P, defined in front face (106'). Also defined in front face (106'), are openings marked P. These are for mounting the control and monitoring panel of the pneumatic means (400). Reference is made to FIG. 5. Openings P in back face (110') and front face (106') are to accommodate the detachable attachment of pneumatic means (400) which includes the piston. The electrical connection and air connection pass from the piston through opening E4P and opening E5P and connect to pneumatic means (400) mounted on the front face (106'). Pneumatic means (400) has extending from it an electrical cord (402) and an air pressure hose (404). Electrical cord (402) may be connected to an outside outlet, or there may be yet another opening defined in base unit (600) in compartment (112) for detachable connection to electrical cord (402). Air hose (404) connects to outside air means such as a compressor.

Returning to FIG. 2, front face (106'), in the area which does not act as a portion of compartment (112), defines additional bolt openings bt. These are for detachably mounting an electromagnetic device or magnetic means (700') as seen in FIG. 6a. Cord or wires (702) that extend from electromagnetic device (700'), plug into or electrically attach to compartment (112) through opening E2 as earlier discussed. This enables electromagnetic device (700') to connect through switch (116') for operation in conjunction therewith. Additional openings could be included to mount several electromagnetic devices (700'). These would be interconnected with each other and then connected to a central powering means, as in compartment (112), by one cord (702) which plugs into opening E2.

Figure 7:
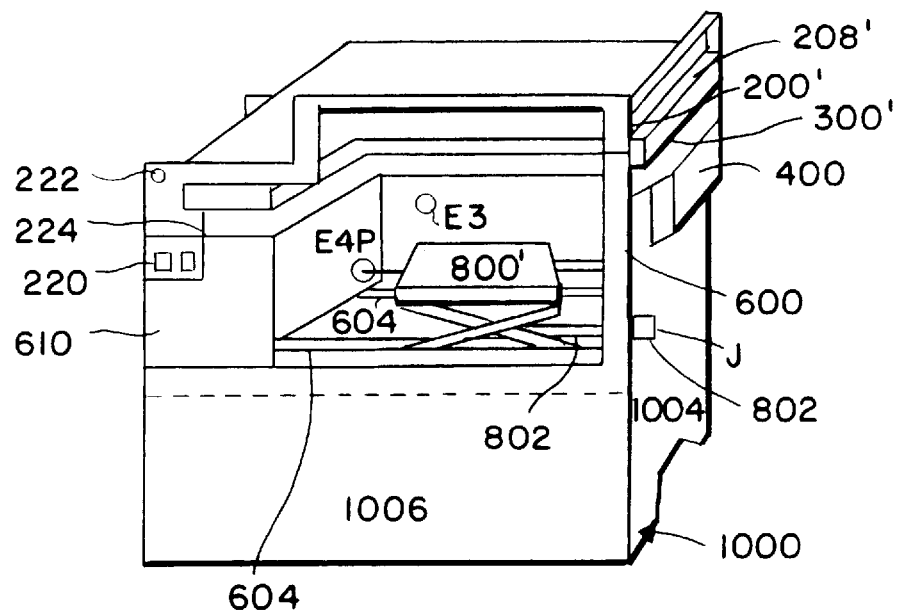
FIG. 7 is an end view of the FIG. 5 embodiment.

The last opening in base unit (600), is opening J, in front face (106'). Opening J is located in the area which lies under hot sealing frame (200') when it is attached to base unit (600). Opening J is for extension of a mechanical or electromechanical means for adjustment of scissor jack (800'), as seen in FIG. 7. If the means is mechanical, it may simply be a knob connected to scissor jack (800'). This may be turned to raise or lower scissor jack (800'). If the means is electromechanical, it would be a device to power the raising and lowering of scissor jack (800). In such an instance, the electrical connection for scissor jack (800) would again either plug into an outside outlet or through an opening defined in compartment (112) for power.

In the foregoing discussion, many of the modular units which may be used with the base unit (600) herein have been briefly discussed. These units along with others will now be discussed in greater detail with reference to the remaining figures of the drawing.

FIG. 2 discloses base unit (600) of this invention. Base unit (600), could be sold alone and many of the attachments noted above later purchased for use therewith. One would likely purchase with base unit (600) a top surface (102') which is detachably attached to lips or edges (608') and through which switch (116') would extend. Hot sealer frame (200') would also be purchased to attach detachably to mounts (610). Similarly, one would purchase the electrical components necessary for operation of hot sealer frame (200') which would be housed modularly or in hard-wire fashion in compartment (112). As such, base unit (600), with top surface (102'), electrical components, and sealing frame (200') would be detachably connected together to be placed on a floor or table top and used. However, many people may wish the device to have its own stand and to connect to a manual or automatic plastic feeder unit. FIGS. 3 and 5 address these desires.

In FIG. 3, a stand (1000) is shown. It is largely rectangular in shape having extending from its bottom, two legs (1002). Stand (1000) has a front surface (1004), two opposing side surfaces (1006), a back surface (1008), and a recessed top surface (1010). Recessed top surface (1010) is largely surrounded by an upstanding edge (1012). Edge (1012) is cut away at (1014) on one side in the area of front surface (1004). The width of top surface (1010) is generally equal to that of base unit (600) and mounts (610) so that base unit (600) may sit on top surface (1010). In this position, front face (106') of base unit (600) lies generally in line with front surface (1004). The length of base unit (600) corresponds with the length of edge (1012) on front surface (1004). This leaves the area defined by cut away section (1014) free.

In use, and as seen in FIG. 5, base unit (600), with sealing frame (200'), the electrical components, and top surface (102'), are placed on top of stand (1000). If the user desires a manual or automatic plastic feed unit (1102) with a plastic feed roller (1100'), these are available for detachable use with base unit (600) as self contained plastic feed unit (1102). Unit (1102) is placed next to base unit (600) by sliding it into cut away section (1014). Plastic feed unit (1102) is designed to have the dimensions to enable its fitted placement next to base unit (600) on stand (1000). Alternatively, plastic feed unit (1102) and base unit (600) may be simply set adjacent to one another on any surface and detachably clipped together by known means. If plastic feed unit (1102) is automatic, then in its body, all of its needed electrical components will be housed. A wire will extend from the body for detachable connection to an outside power source or through an opening in compartment (112). If a timer is needed to time the feeding of the plastic from plastic feed unit (1102), this timer may be housed in plastic feed unit (1102). Alternatively, by plugging plastic feed unit (1102) into compartment (112) there may be a central timer or connection through switch (116') for powering and shutting off plastic feed unit (1102) so that roller (1100') dispenses plastic at a set time. The manner of handling these electrical connections is not significant to this invention. What is significant is the modularity of each unit. Plastic feed unit (1102) is constructed such that it can operate independently of base unit (600) or in conjunction therewith and is detachably connected thereto.

Figure 6B:
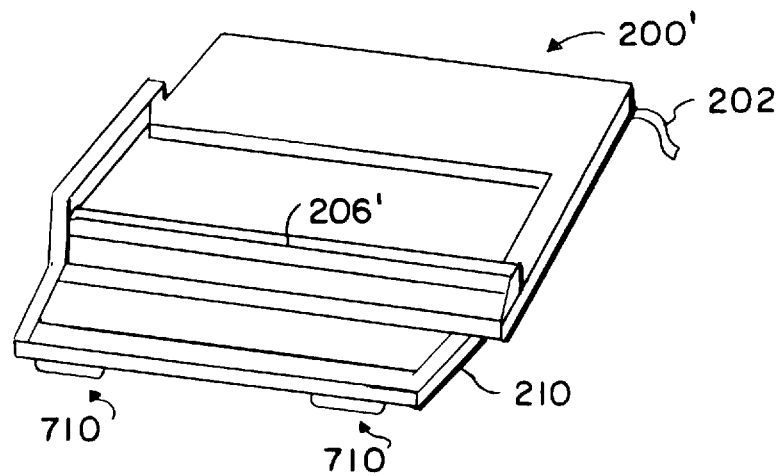

FIGS. 6a and 6b detail electromagnetic device (700) of the invention. Again, the exact means of making this device is not the subject of this invention. What is the subject of this invention is that this device, as the other devices, are units which can be used independently of or dependently with base unit (600) and are detachably connected thereto. In FIG. 6a, there is shown a box for holding the electrical components of electromagnetic device (700) This box includes a timer, a rectifier bridge, transformer, fuse holder, etc. Electro-magnetic device (700) is capable of independent operation or can be plugged into E2 to obtain its power through the operation of switch (116').

Magnet (704) extends from the top surface of electromagnetic device (700). It functions magnetically when electromagnetic device (700) is powered. Attachment wings (706) extend from the back surface of electromagnetic device (700) and have elongated openings (708). Openings (708) elongated so that electromagnetic device (700) may be adjustably mounted on front face (106') of base unit (600) through means of bolt hole openings bt. A bolt or other securing device, is passed through opening (708) and bt in front surface (106'), When electromagnetic device (700) is in the proper position, nuts and washers, if necessary, are affixed to the bolts to hold electromagnetic device (700) in place.

In FIG. 6b, attachment (210) is affixed permanently or removably below handle (206') to hot sealing frame (200'). Attraction plates (710) extend from the base of attachment (210) and are dimensioned and created to respond to the magnetic force offered by magnet (704). Since two attraction plates (710) are shown, two electro-magnetic devices (700) have been mounted to front face (106') of base unit (600). Each device has a magnet (704) which interacts with a respective attraction plate (710) to hold arm (200') against pads (300') for a set period of time. Instead, one electro-magnetic device (700) with several magnets (704') or one long magnet (704') could be used. Again, the point of invention is not the exact configuration of the devices, but that they are modularly attachable, independently operable units which may be purchased and added to a base unit (600) as a separate independent means to enhance the function of base unit (600). Prior art devices offer these components hard-wired and welded to the base unit. They are not detachable nor interchangeable. All rectifiers, timers and the like are held in the base machine. There is no separate, fully contained, electromagnetic device, pneumatic device, or other device described herein which can be readily removed from the base machine.

FIG. 7 depicts the positioning of scissor jack (800') in base unit (600) and the detachable and adjustable connection of sealing frame (200') to mounts (610). Scissor jack (800'), is seen in open end (606) of base unit (600) resting on top of support bars (604). The feet of scissor jack (800') are detachably attached to support bars (604). Opening E4P in back face (110') has extending therethrough, the pneumatic tube and wire associated with pneumatic means (400). This includes the piston on back face (110'). Scissor jack (800') is situated so as not to interfere with this passage of tubes and wires from E4P to E5P. The adjustment mechanism for scissor jack (800'), whether mechanical or electrical, extends out of opening J so that scissor jack (800') may be raised or lowered in height with respect to top surface (102'). If scissor jack (800') is automated, its full electrical means, including motor etc. is connected to it. Therefore, only a powering wire extends from scissor jack (800') for connection to an outside power source or to compartment (112). In prior art devices, whether scissor jack (800) is manual or automatic, it is permanently affixed to machine (100). One cannot simply remove scissor jack (800) by unbolting it and unplugging it. In the present invention, removable and separate use is readily possible, by disconnecting the feet of scissor jack (800') from support bars (604), removing the control from opening J, and if automated, unplugging scissor jack (800') from compartment (112).

In use, scissor jack (800) may be brought up to the level of top surface (102') and used as work surface (104'). Alternatively, conveyor (500') may be placed on the top surface of scissor jack (800'). By adjustment of scissor jack (800'), conveyor (500') whose surface is comprised of an endless belt (502), can be brought up to the level of top surface (102') so that it becomes work surface (104').

Figure 8:
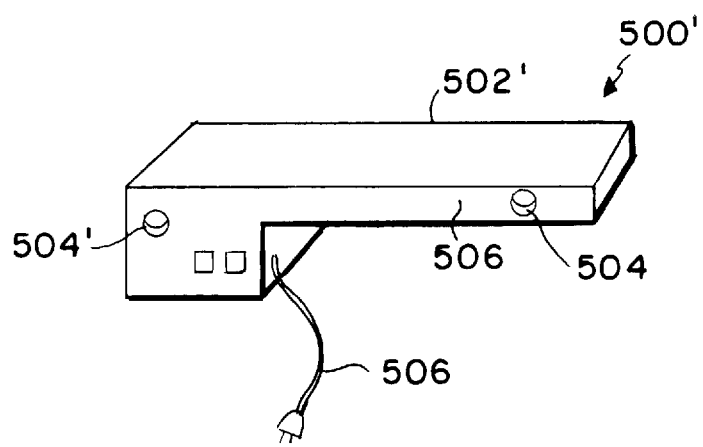
FIG. 8 is a conveyor means which is ready for detachable connection to the base machine of the invention.

A conveyor (500') for use with the present invention is shown in FIG. 8. Conveyor (500'), is self contained, having its own motor, speed control, timer, and electrical means held on its body. In this configuration it may be simply plugged into any outlet and operate or plugged into compartment (112) through opening E3 and operate. In FIG. 8, conveyor (500'), is shown in some detail. It includes an endless belt (502') which rolls around idle and drive rollers (504'). Cord (506) extends from conveyor (500') for electrical connection to a power source. Conveyor (500') is detachably connected to the surface of scissor jack (800') by detachable means such as bolts and nuts, or other devices. As with the other devices described herein, conveyor (500') and scissor jack (800'), each define holes or means for such detachable connection to each other. Generally, by connection through E3, conveyor (500') is connected to momentary switch (116') to work therewith. In this way, when momentary switch (116') is in position to power heating element (208') in frame (200'), conveyor (500') will not operate because of the positioning of momentary switch (116'). This occurs when frame (200') has been brought against pads (300) and momentary switch (116') is depressed by the weight of frame (200'). When frame (200') is brought away from pads (300) and momentary switch (116') is released, then conveyor (500') will be powered through connection E3 so that the endless belt (502) will turn to move the items on the endless belt (502) toward open end (606).

The detachable and adjustable connection of hot sealing frame (200') is seen in FIG. 7 in conjunction with FIG. 9, with FIG. 9 being a rear view of FIG. 5 with plastic sealing device (1102) absent. Hot sealing frame (200'), attaches at its rear end to mounts (610) by means of a pivotal and adjustable connection (222) through support foot (224). Pivotal connection (222) involves a pivot pin connected to hot sealing frame (200'). Defined in the bottom portion of support foot (224), are elongated openings (220). A bolt may be passed through these openings (220) and openings defined in mounts (610) to detachably connect hot sealing frame (200') to base unit (600). This adjustable attachment is desirable for two reasons. The attachment is simple in nature so that hot sealing frame (200') may be readily attached and detached by removing the bolts and disconnecting wire (202') as discussed above. Further, elongated openings (220) enable the adjustable attachment of hot sealing frame (200') in the area of heating elements (208') and pads (300'). This is important since each set of pads (300') differs in thickness, and over time and with use, the thickness of pads (300') diminishes. Thus, the distance of the frame (200') from top surface (102') must be adjusted to ensure that a good contact is made between frame (200') and pads (300').

Noting the detachable connection of hot sealing frame (200') to base unit (600'), if one wishes to remove hot sealing frame (200') and replace it with another hot sealing frame (200'), this is easily done. Support foot (224) is unbolted and wire (202') is unplugged. This may be desired if a hot sealing frame (200') of another configuration or with different features is needed. This could be a hot sealing frame (200') configured to work with odd-shaped items. In such an instance, heating element or wire (208') is no longer of an L configuration. This could also be a hot sealing frame (200') with options as disclosed in the inventor's U.S. Pat. No. 5,177,931, this patent being incorporated herein by reference. It could also be a hot sealing frame (200') permanently fitted with attraction plates (710) as in FIG. 6b.

Pads (300') may also be removed and replaced with differently configured pads (300'). Due to the adjustable attachment of hot sealing frame (200'), the user will be assured that there will be a good contact between the replaced pads (300') and hot sealing frame (200').

Reviewing FIG. 9, the piston associated with pneumatic means (400') is seen removably connected to hot sealing frame (200'). If no pneumatic means (400') is used, this connection would not appear. Instead, hinges or spring means (not shown) will detachably attach between the rear of hot sealing frame (200') and lip or edge (608) of back face (110'). The spring biases hot sealing frame (200') away from work surface (104'), pads (300') and top surface (102'). The spring may again be mounted on plates which can be readily bolted to lip or edge (608) of back face (110') and to hot sealing frame (200') at its rear side in the area where hinges (203) are shown in the prior art device of FIG. 1. Instead they could be centrally located on lip or edge (608) of back face (110'). Alternatively, the springs may be omitted in favor of the counterweight system to be described in FIGS. 10 through 13a and 13b.

An automatic operating device can too be added to the system. This would be done by replacing the modular electrical components held in compartment (112). Alternately, one could merely add the unit to the hard-wired components and change if necessary, hot sealing frame (200'). This device would cause the machine to operate in a fully automatic mode accommodating all parts attached thereto. Thus, the arm would be lifted and lowered, the conveyor operated, the plastic dispensed all in a timely fashion to wrap articles.

FIGS. 10 through 13a and 13b disclose a further embodiment of the invention. Added to an L sealer or shrink wrap machine is a counterweight arrangement (2000). The movement of the counterweight arrangement (2000) is controlled by friction. The inventor has combined a friction or damping device and a counterweight in one simple device, counterweight, (2002).

When using a manual L sealer or shrink wrap machine, the operator stands in front of the machine and manually lowers the sealing frame (200', 200). The sealing frame (200', 200) which contains the heating elements and electrical wires (208, 208'), is lowered onto pads (300', 300) and around work surface (104, 104') upon both of which lie the plastic film layers. Between the plastic film layers is the item to be sealed. The heat from the heating elements (208', 208) melts, seals and cuts, or laminates the plastic layers together under the heating elements (208, 208') thereby making a plastic container in which the item is now sealed. Once this melting, sealing, cutting process is completed, the operator lets loose of the sealing frame and the frame raises up by itself and stops. It is ready for the operator to lower it again, once more plastic has been pulled over pads (300, 300') and work surface (104, 104') and the item to be sealed is placed between the plastic layers.

In the typical manual machine, sealing frame (200, 200') automatically returns to its raised position by biasing means which include hinges (203, 203'), and torsion springs or compression springs (not shown). To keep frame (200, 200') from bouncing at the top of the stroke, damping means such as a gas piston are also employed. With counterweight arrangement (2000) disclosed in FIGS. 10 through 13a and 13b, the need for torsion or compression springs alone or in combination with a gas piston damping device is eliminated. The counterweight arrangement (2000) eliminates the need for the pneumatic device (400, 400') and its piston, and can be used in conjunction with the magnetic device (900, 900') disclosed herein.

Use of counterweights in other art areas is known, although use as disclosed herein does not appear. C. C. Mitchell in U.S. Pat. No. 2,995,048 discloses a counterweight on an oil pump. Montgon in U.S. Pat. No. 4,867,321 discloses a counterweight on a crane. Similarly, one might review U.S. Pat. No. 1,497,686 for a counterweighted crane; U.S. Pat. No. 3,175,513 for a counterweighted hydraulic pumping unit; U.S. Pat. No. 2,198,348 for a roller-mounted, counterweighted oil pumping unit, and U.S. Pat. No. 3,130,601 also for a roller-mounted, counterweighted oil pumping unit. These patents are incorporated herein by reference. Use of a counterweight in the art of L sealers or shrink wrap devices is not found just as modular L sealers or shrink wrap devices are not found.

Typically, one uses a counterweight to facilitate lifting or lowering. The position of the weight is adjusted with respect to the fulcrum point or vice versa, of a pivoting device which does the lifting or lowering. Consider the traditional teeter totter. If the weight and fulcrum point are used alone, there can be considerable jarring and bouncing at the end of the weighted stroke. To eliminate this effect, prior art devices have turned to pistons, hydraulic means, counterweight adjustment devices, and brakes to damp the movement and adjust the position of the counterweight. These are generally complex units and examples of these devices are seen in some of the above-noted patents.

The present invention has been designed to work with the needs of an operator who must use repetitive physical actions to pivot a device from one position to another. This occurs in raising and lowering the arm of L sealers or shrink wrap devices. The present invention has also been designed to simplify the resolution of counterweight problems of jarring and position adjustment. In arriving at these simple solutions, the result has been a unit that is easy to install and use. It is also a unit that is inexpensive to manufacture because it is composed of simple and basic elements. Since the device is composed of simple and basic elements, it does not require complex repairs or expensive replacement parts.

In FIG. 10, counterweight (2002), which is heavier than sealing frame (200'), is shown located at the back of the L sealer in the area of back face (110'). In this position, it biases sealing frame (200') to an upward position away from pads (300'). Counterweight (2002) is comprised of a rectangular weight defining two spaced-apart openings seen as tubular elements (2004). These protrude from the top of counterweight (2002). Detachably or fixedly attached to back face (110') are spaced-apart vertical mounts (2006). Between the outside faces of vertical mounts (2006) and the ends of counterweight (2002) extend counterweight brackets (2008). The end of counterweight bracket (2008) which is connected to mount (2006) is pivotally connected to vertical mount (2006). This connection, can be a standard connection or optionally, connection by a friction adjustment device (2010). The portion of counterweight bracket (2008) which is connected to counterweight (2002) contains several connecting points (2012) so that counterweight (2002) may be adjusted at different distances from vertical mounts (2006). This connection is not a friction connection and is intended to be a solid connection, although one that can be loosened for distance adjustment.

Figure 11:
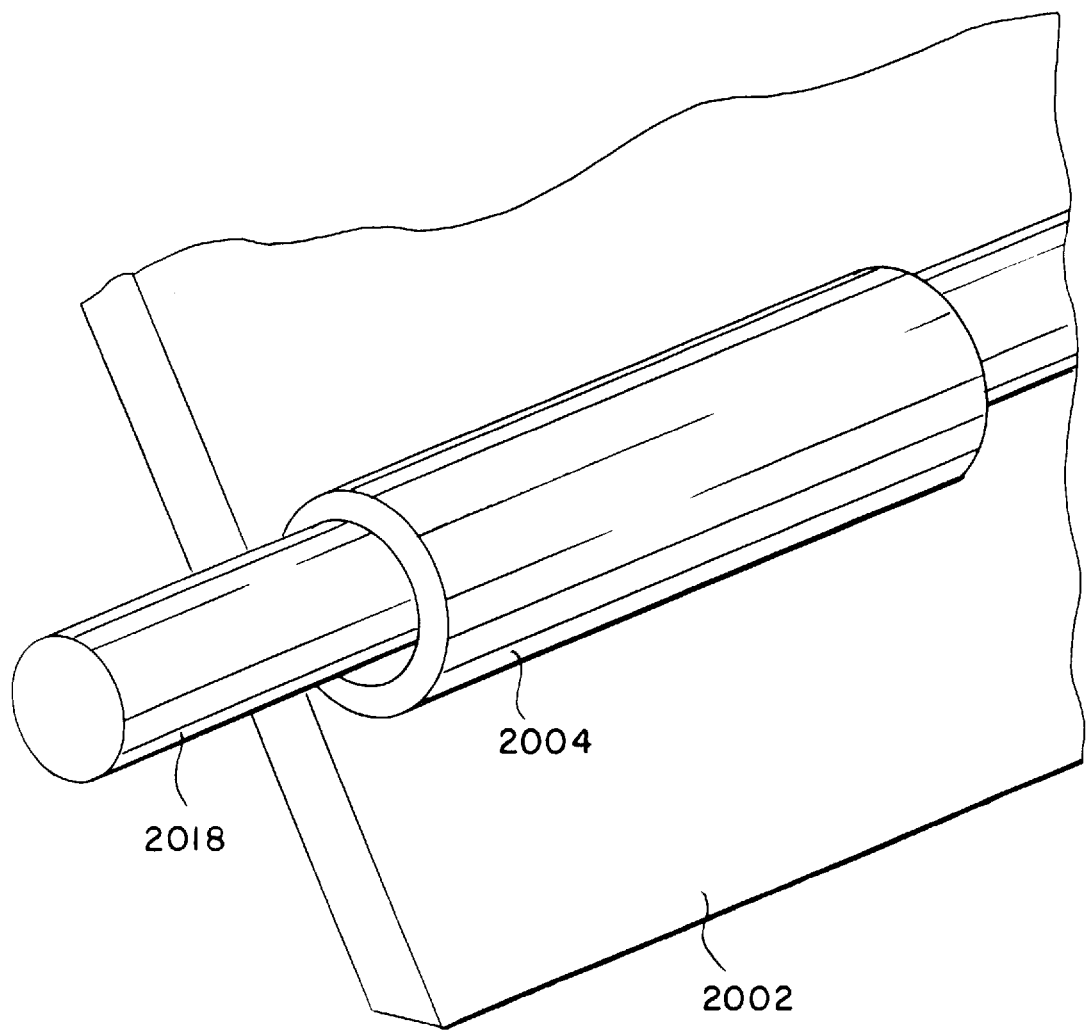
FIG. 11 is an enlarged perspective view of the friction elements of the counterweight of FIG. 10.

Connected to the back of sealing frame (200') near back face (110') is plate (2014). This plate extends from sealing frame (200') to cover in part wire (202) and abut momentary switch (116). In this embodiment, it also covers extensions (2015) which extend from the back of sealing frame (200') and are shown in dashed lines in FIG. 10. Two spaced-apart tubular receptors or coupling bodies (2016) rise above the top surface of plate (2014) and are connected to extensions (2015). Although not shown, plate (2014) includes sections which are cut out for the connection of coupling bodies directly to extensions (2015). Detachably but fixedly mounted in tubular receptors or coupling bodies (2016), are rods (2018). Rods (2018) are mounted within tubular receptors or coupling bodies (2016) by pins, set screws, bolts or the like (2017). Rods (2018) are preferably smooth in finish and solid. In one embodiment of the invention, rods (2018) are comprised of a smooth steel and coated with black chrome. Tubular elements (2004) are unsmoothed steel. Rods (2018) extend between tubular receptors or coupling bodies (2016) and tubular elements (2004). As seen in FIG. 11, the inside diameter of tubular elements (2004) is greater than the outside diameter of rods (2018). Tubular elements (2004) are positioned with respect to tubular receptors or coupling bodies (2016) so that rods (2018) are eccentrically situated in and rubbing against a portion of the inside surface of tubular elements (2004). Pin (2020) extends through or to and are welded to extensions (2015). Pins (2020) extend from extensions (2015) into flange bearings or bearings (2022) wherein they are mounted. This is a point for pivot and is actually a fulcrum point. Damping means may be added at this point if desired. Flange bearings or bearings (2022) are detachably connected by bolts and washers or other means (2024) to vertical mounts (2006). Vertical mounts (2006) include openings (2026) for adjustable receipt of connecting means (2024).

Figure 13A:
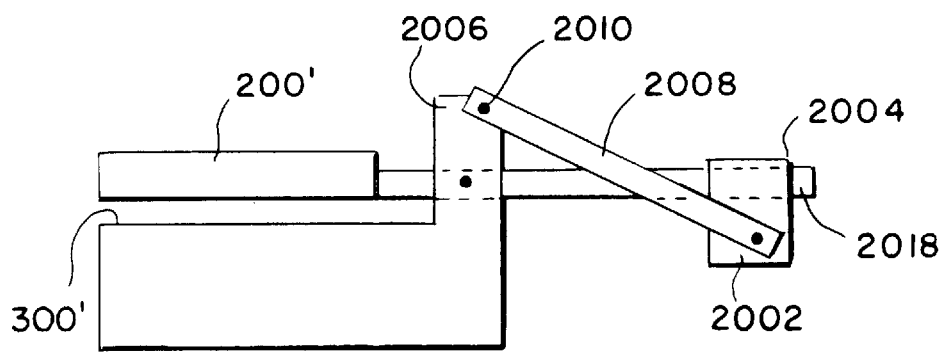
FIGS. 13a and 13b are diagrammatic side views of the embodiment of FIG. 10 with the sealing frame in a lowered and raised position respectively.
Figure 13B:
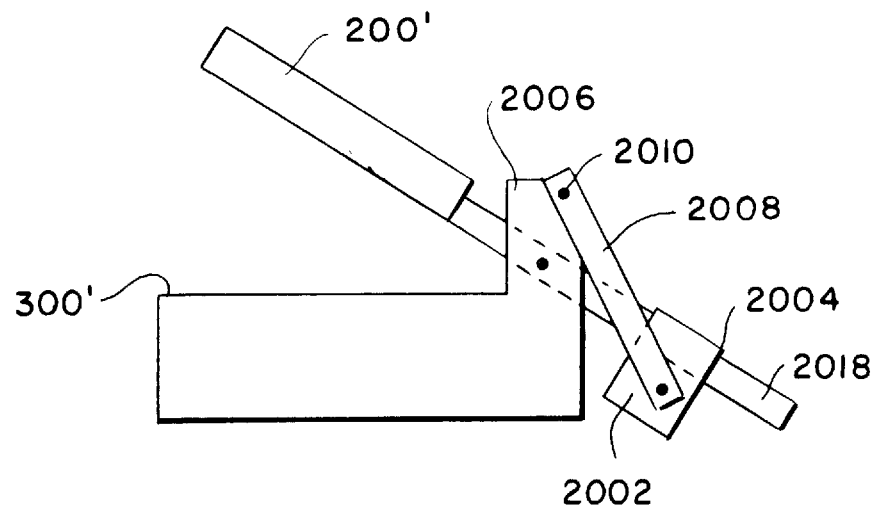

In use, pin (2020) will turn in flange bearings or bearings (2022) as sealing frame (200') is raised and lowered. At the same time, counterweight (2002) will slide toward and away from connecting means (2024) by frictional movement of rods (2018) within tubular elements (2004) during the raising and lowering of sealing frame (200'). FIGS. 13a and 13b depict this movement and positioning of parts. The choice and texture of the materials used for parts that engage in friction to damp the movement of sealing frame (200') will be chosen to provide the needed damping and will be chosen in consideration of the long term wear and durability of the parts. Thus rods (2018) may be coated, covered with, or comprised of one material and texture, while the inside of tubular elements (2004) may be coated, covered with, or comprised of another or the same material.

Figure 12:
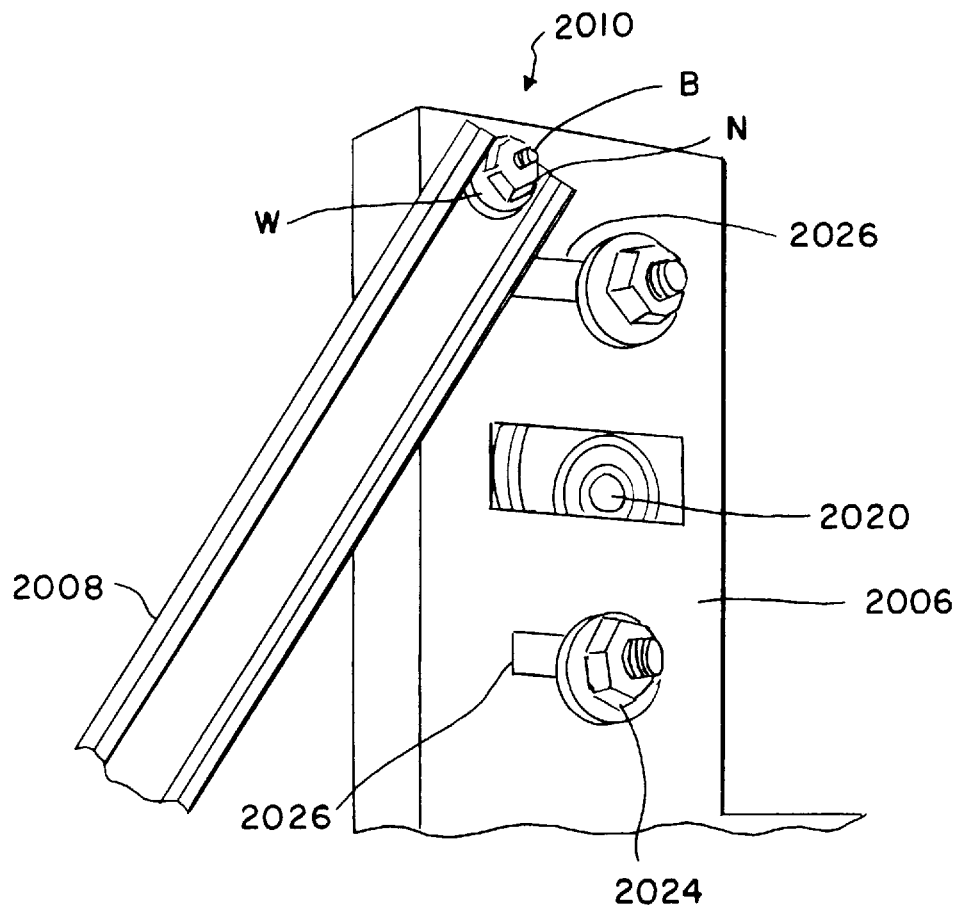
FIG. 12 is an enlarged view of a connection point of the friction-controlled counterweight of FIG. 10 wherein greater or lesser friction can be created.

In addition to the friction offered by the interrelationship of tubular elements (2004) and rods (2018), there is also optionally offered, friction in the connection between counterweight brackets (2008) and vertical mounts (2006) at friction adjustment device (2010). FIG. 12 is an enlarged view of this connection. In this view, a standard threaded bolt or screw (B), nut (N) and washer (W) relationship are depicted. Nut (N) may be ribbed or smooth on the side which faces washer (W). Similarly, washer (W) may be ribbed or smooth on either of its sides, these alterations, change the amount of friction control which is offered at this point. This also occurs by the tightening of nut (N) against washer (W). The inclusion of washer (W) is optional. Thus, alternatively, or in addition, washer (W) may be deleted or replaced by a biasing spring washer such as a bellevill disc spring; a polyurethane flat disc spring, finger disc spring or a curved disc spring all as known in the art. Whatever the replacement, it would be situated between nut (N) and counterweight bracket (2008). By tightening nut (N) further and further against the biasing spring washer (W), the friction between counterweight bracket (2008) and vertical mount (2006) is increased as counterweight bracket (2008) pivots back and forth in response to movement of sealing frame (200'). The materials chosen, and surface textures used for the interface of friction adjustment device (2010), vertical mount (2006) and counterweight bracket (2008) will be selected in consideration of the amount of desired friction and durability over time. In this respect, nut (N) could be a lock nut, of the nylon locking type. One can then increase the tension of the lock nut with respect to counterweight bracket (2008) or decrease the tension of the lock nut with respect to counterweight bracket (2008) by manipulation of the nut. The friction between the vertical mounts (2006) and the counterweight bracket (2008) helps affects the damping of the movement of sealing frame (200').

Similarly, the inside surface of tubular elements (2004) can be manufactured with increased or reduced surface roughness to increase the amount of friction between rod (2018) and tubular element (2004). The degree of desired friction between the two surfaces and ware over their lives in this relationship, will dictate the materials chosen for these parts and any coatings and surface finishes given them.

The foregoing arrangement of parts has eliminated the need for torsion or compression springs, hydraulic damping means, pistons, and solenoid control. These have been replaced simply using symmetrically arranged, mobile counterweight and friction points, the latter being an item prior art devices attempted to avoid.

Operation of the device is best seen with reference again to FIGS. 13a and 13b. As sealing frame (200') is pulled toward pads (300'), counterweight (2002) slides on rod (2018) away from vertical mounts (2006). Counterweight (2002) is heavier than sealing frame (200'). Therefore, when pressure on sealing frame (200') against pads (300') is released, counterweight (2002) will bias sealing frame (200') away from pads (300'). To eliminate the jarring motion of sealing frame (200') as sealing frame (200') reaches the top of its stroke, counterweight (2002) slides forward on rod (2018) toward vertical mounts (2006). This movement of counterweight (2002) changes the weight relationship of sealing frame (200') with respect to counterweight arrangement (2000), as is well understood by those skilled in the art. This reduces the momentum of the movement of sealing frame (200') in its upward stroke reducing the jarring motion at the end of the stroke. This action is also facilitated by the frictional relationships discussed above. There is primarily the friction points between rod (2018) and tubular element (2004). A further friction point is available between counterweight bracket (2008), vertical mounts (2006), and friction adjustment device (2010). Each friction point offers the needed damping and controlling effect obtained in the prior art by such complex mechanisms as motors, pistons and hydraulic devices.

Counterweight arrangement (2000), as is seen, can be readily attached to any pivotal arm arrangement such as an L sealer or even items as far afield as cranes, oil rigs, paper cutters, ironing presses or photocopy machines. Alternatively, it can be made integral with these devices. The dual use of a counterweight as the weight and the damping device for the system makes the system easy to install, operate, manufacture and maintain. Tubular elements (2004) can be detachably mounted to counterweight (2002) to make easier their replacement due to wear, replacement with a tubular element (2004) of a different diameter or configuration, or attachment to a counterweight of different weight. Alternatively, tubular elements can be formed with counterweight (2002) and be detachably connected to an inside sleeve which will rub against rod (2018). As the sleeve wears, it can be simply replaced by another. Or, if a differently configured sleeve is desired to increase or decrease friction, it can be selected to replace the sleeve already being used. To remove the entire counterweight unit, one would merely loosen the connection between rods (2018) and coupling bodies (2016) and between counterweight brackets (2008) and vertical mounts (2006). The entire counterweight assembly (2000) could then be removed for repair, replacement, or non use.

We now return to an overall view of the modular shrink wrap machine disclosed herein. By the selected electrical wiring of the momentary switch (116') of the invention, the base unit (600) may be connected to various ones of the modular units here disclosed by simply plugging these units into compartment (112). A few non limiting examples follow.

A base unit (600) and top surface (102') with pads (300') are equipped with a conveyor (500'), frame (200'), pneumatic means (400') and momentary switch (116'). It will be recalled that the piston is connected by means of a tube and wiring to pneumatic means (400') which by means of its own connections brings in power and air. A reed switch is attached to the piston, and the plunger of the piston is attached to the rear of frame (200'). The piston includes a magnet such that when the plunger moves downwardly so does the magnet, the reed switch responds to the magnet and triggers the release of high pressure through the air tube into the piston. This high pressure situation will push up the plunger of the piston and thereby bring the frame (200') down against pads (300'). The actual operation of the system is as follows. The pneumatic means (400'), whether plugged into compartment (112) or into a regular outlet, is not connected to the momentary switch (116'). It, instead, has its own timer mechanism. Palm Buttons (PB) on the top of the pneumatic means (400'), as seen in FIG. 5, and known in the art, are pushed to activate the pneumatic means (400'). This starts the timer of the pneumatic means (400'). Air then begins to flow at low pressure into the piston to lower hot sealing frame (200') toward pads (300'). This eventually causes the magnet in the piston to pass near the reed switch attached to the piston, which causes the reed switch to move to a closed position. In this position, the air pressure in the pneumatic means (400') increases which pushes the hot sealing frame (200') against pads (300') with increased pressure. The timer in the pneumatic means will then turn off, the air pressure will be dropped to a low level again and the sealing frame (200') will be lifted upwardly away from pads (300').

Concurrent, with the foregoing activity, the momentary switch (116') is depressed and released. The conveyor (500'), which is connected through opening E3 into compartment (112), is connected also to the momentary switch (116') through the E3 connection. When the frame (200') is being held against pads (300'), momentary switch (116') allows current through wire (202') and (208') but does not allow power to pass to conveyor (500') through opening E3. When the hot sealing frame (200') is allowed to come up, momentary switch (116') is released, power to wires (202', 208') is stopped and conveyor (500) is activated by power through connection E3 so that items on the endless belt (502), which has acted as work surface (104'), are moved. A timer or sensor will stop the conveyor before pneumatic means (400') again causes frame (200') to move downwardly. Alternatively, the simple movement of frame (200') downwardly due to the pneumatic cycle will cause conveyor (500') to stop operation because of the pressure on momentary switch (116'). One can readily see that the if the plastic feed unit (1102) is connected into the momentary switch (116') and is automatic, it too can be caused to feed in new plastic sheets each time frame (200') is lifted.

In a similar vein, a base unit (600) could be equipped with magnetic means (700') above, instead of the pneumatic means (400'). This means that through its connection into opening E2, it would be connected to momentary switch (116'). When frame (200') is brought against pads (300'), depression of momentary switch (116') would allow power to pass into the magnetic means (700') from compartment (112) thereby activating the magnetic means to magnetize magnet (704). Magnet (704) would then attract attraction plate (710) on frame (200') to hold frame (200') against pads (300'). A timer in magnetic means (700') would eventually stop the power from compartment (112), frame (200') would be lifted by the bias of the spring, the momentary switch (116') would be released and the conveyor (500') activated as above.

Other combinations of modular units and their interrelationships will be apparent to those skilled in the art given the foregoing teachings. While attachment means such as holes and bolts have been often discussed herein, these may be replaced by any attachment means which enable the easy attachment and detachment of parts.

In conclusion, a truly modular unit is available to the user. This unit may include any one of or a combination of the modular self standing units discussed above as well as other units. Thus and by way of example but not limitation, a base manual unit may be first purchased. Later, it may be added to by a manual plastic feeder. The two can then be augmented by a stand. As time progresses, these units may be enhanced by a conveyor and/or pneumatic means, sealing arms of various configurations, electromagnetic means, an automatic arm control, an automatic plastic feeder, and a counterweight. With the teachings of the present description, one can understand that the present invention may be upgraded or downgraded as desired, with little lost cost to the owner of the machine and with great ease. The inventor has invented a user-friendly, modular device with components that work independently of or in conjunction with each other. The invention provides the user with the option to create a personally designed machine which may be upgraded or down graded as desired and which is susceptible to continuous modular modification such that it can reflect the current technology of the time. The modules may be separately used for services without the base unit. By way of example, the conveyor could be plugged into a wall plug and used for other purposes. Similarly, the scissor jack could be so used as could any of the other units.

The present invention is claimed as follows:

1. A sealing system for sealing plastic wrap around an item, the system comprising:

a base unit;

electrical components in the base unit for controlling and powering the system;

an electrically powered hot sealing frame for sealing a first layer of plastic wrap and a second layer of plastic wrap together, the sealing frame being pivotally attached to the base unit and having a back portion and an elongated heated portion extending from the back portion to define a side portion and a front portion, wherein the elongated heated portion contacts the first layer of plastic wrap so that the first layer of plastic wrap melts to the second layer of plastic wrap under the elongated heated portion, an extension extending from the back portion of the sealing frame;

a counterweight damping device comprised of one piece, the counterweight damping device frictionally and slidably mounted on the extension and pivotally mounted to the base unit such that when the frame is pivoted away from the base unit, the counterweight slides on the extension toward the base unit and when the frame is pivoted toward the base unit, the counterweight moves on the extension away from the base unit, the friction slowing the movement of the sealing frame as it pivots toward and away from the base unit.

2. The system of claim 1 wherein the extension is a surface of a first texture in the area where the counterweight will slide, and the counterweight is a surface of a second texture in the area which contacts the extension, so that the movement between the counterweight and the extension is damped.

3. The system of claim 1 wherein the counterweight in the area where it slides on the extension is of a first material and the extension in the area where the counterweight will slide is made of a second material different from the first material so that the movement between the counterweight and the extension is damped.

4. The system of claim 1 wherein the counterweight is heavier than the sealing frame to bias it away from the base unit.

5. The system of claim 1 wherein there are two extensions extending from the sealing frame, the extensions being spaced from each other and symmetrically arranged on the back of the sealing frame.

6. The system of claim 5 wherein the counterweight extends between the two extensions and is the same length as the back of the sealing frame, and wherein mounting brackets attach between the counterweight and the base unit for the pivotal movement of the counterweight on the base unit.

7. The system of claim 1 wherein the counterweight is detachably connected to the system.

8. A modular sealing system for sealing plastic wrap around an item, the system comprising:
   a base unit;
   electrical components in the base unit for controlling and powering the system;
   an electrically powered hot sealing frame for sealing a first layer of plastic wrap and a second layer of plastic together, the sealing frame being pivotally attached to the base unit and having a back portion and an elongated heated portion extending from the back portion to define a side portion and a front portion, wherein the elongated heated portion contacts the first layer of plastic wrap so that the first layer of plastic wrap melts to the second layer of plastic wrap under the elongated heated portion; the system being detachably connectable to at least one of: an electrically operable pneumatic sealing device to automatically raise and lower the hot sealing frame, an electrically operable magnetic sealing device to lock the hot sealing frame in place for a selected time.

9. A modular sealing system for sealing plastic wrap around an item, the system comprising:
   a base unit;
   electrical components in the base unit for controlling and powering the system;
   an electrically powered hot sealing frame for sealing a first layer of plastic wrap and a second layer of plastic together, the sealing frame being pivotally attached to the base unit and having a back portion and an elongated heated portion extending from the back portion to define a side portion and a front portion, wherein the elongated heated portion contacts the first layer of plastic wrap so that the first layer of plastic wrap melts to the second layer of plastic wrap under the elongated heated portion; the system being detachably connectable by detachable fastening or association to an electrically operable scissor jack, an electrically operable plastic feeder, an electrically operable conveyor, a manually operable scissor jack, a manually operable plastic feeder, a manually operable conveyor; the electrically operable scissor jack, electrically operable plastic feeder, electrically operable conveyor, manually operable scissor jack, manually operable plastic feeder, and manually operable conveyor each being operable with the system or independently of the system.

10. The modular sealing system of claim 8 wherein the electrical components are contained in a single unit which is modularly situated in the base unit, such that the single unit may be placed in and removed from the base unit, the unit acting to electrically operate the system and to serve as an electrical source for connecting other units thereto.

11. The modular sealing system of claim 9 wherein the system is detachably connectable to at least one of: an electrically operable pneumatic sealing device to automatically raise and lower the hot sealing frame, an electrically operable magnetic sealing device to lock the hot sealing frame in place for a selected time.

12. The modular sealing system of claim 11 wherein the electrically operable scissor jack, an electrically operable plastic feeder, an electrically operable conveyor, a manually operable scissor jack, a manually operable plastic feeder, a manually operable conveyor, electrically operable pneumatic sealing device, and the electrically operable magnetic sealing device each are plugged detachably into the electrical components for operation thereof.

13. A machine comprised of:
   a base;
   a frame pivotally attached to the base for movement away and toward the base;
   a counterweight pivotally attached to the base, the counterweight defining an opening therein;
   a sliding extension attached to the frame and passing through the opening in the counterweight, the sliding extension being situated in the opening so as to rub against a portion of the counterweight forming the opening, such that upon movement of the frame, the counterweight moves on the sliding extension, the rubbing between the sliding extension and the counterweight having a damping effect on the movement of the counterweight on the sliding extension.

14. The machine of claim 13 further comprising an electrically operable magnetic sealing device to lock the frame in place for a selected time, the magnetic sealing device being detachably connectable to the machine.

15. The machine of claim 13 further comprising an electrically operable conveyor device detachably connectable to the machine, the conveyor device being operable independently of and with the machine.

16. The machine of claim 13 further comprising an electrically operable plastic feeder detachably connectable to the machine, the plastic feeder being operable independently of and with the machine.

17. The machine of claim 13 further comprising an electrically operable scissor jack detachably connectable to the machine, the scissor jack being operable independently of and with the machine.

18. A counterweight damping system for use on a pivoting arm such as the arm of a shrink wrap device having a sealing arm and a base, in use the sealing arm pivoting upwardly away from the base and downwardly toward the base, the system being comprised of a first part and a second part, the first part being a counterweight damping element; the second part being an extension, the counterweight damping element being mounted on the extension for sliding and rubbing motion thereon, the rubbing between the extension and the counterweight damping element damping the movement of the counterweight damping element on the extension, the counterweight damping element being connectable to the base and the extension being connectable to the arm such that the counterweight damping element slides toward the arm on the extension when the arm is pivoted upwardly away from the base, and away from the arm on the extension when the arm is pivoted downwardly toward the base, wherein there is a damping effect on the movement of the arm in both its upward and downward movement.

19. A shrink wrap machine having a base; a hot sealing arm pivotally attached to the base; and a counterweight system attached to the hot sealing arm to bias the sealing arm to a certain position with respect to the base, the counterweight system acting to bias the position of the sealing arm and damp the pivoting motion of the sealing arm with respect to the base, the system being comprised of a counterweight and an extension, wherein the counterweight is frictionally and slidably mounted on the extension, the counterweight being connectable to the base and the extension being connectable to the arm such that the counterweight slides toward the arm on the extension when the arm is pivoted in a first direction and away from the arm on the extension when the arm is pivoted in a second direction.

20. The shrink wrap machine of claim 19 wherein the machine is comprised of devices for the detachable physical connection to an electronic scissor jack, an electronic plastic feeder, an electrically operable magnetic sealing device to lock the hot sealing arm in place for a selected time, a manual scissor jack, a manual plastic feeder, and an electronic conveyor.

21. A counterweight damping system for use with a movable arm and a base, the system being comprised of a first part and a second part, the first part being a counterweight damping element; the second part being an extension, the counterweight damping element being mounted on the extension for sliding and rubbing motion thereon, the rubbing between the extension and the counterweight damping element damping the movement of the counterweight damping element on the extension, the counterweight damping element being connectable to the base and the extension being connectable to the arm such that the counterweight damping element slides toward the arm on the extension when the arm is pivoted in a first direction and away from the arm on the extension when the arm is pivoted in a second direction wherein there is a damping effect on the movement of the arm in its movement in both directions.

22. A counterweight damping device for attachment to an arm and a base, the arm being pivotally attached to the base, the counterweight damping device comprised of: a counterweight attachable to the base and an extension attachable to the arm, the counterweight being frictionally and slidably mounted on the extension and pivotally mounted to the base such that when the arm is pivoted away from the base, the counterweight slides on the extension toward the base and when the frame is pivoted toward the base, the counterweight moves on the extension away from the base, the friction slowing the movement of the arm as it pivots toward and away from the base.

23. The device of claim 22 wherein the counterweight is eccentrically mounted on the extension.

24. The device of claim 23 wherein the extension is a surface of a first texture in the area where the counterweight will slide, and the counterweight is a surface of a second texture in the area which contacts the extension, so that the movement between the counterweight and the extension is damped.

25. The device of claim 23 wherein the counterweight in the area where it slides on the extension is of a first material and the extension in the area where the counterweight will slide is made of a second material different from the first material so that the movement between the counterweight and the extension is damped.

26. The device of claim 22 wherein the counterweight includes an opening for eccentric mounting on the extension.

27. The device of claim 23 wherein there are two extensions extending from the arm, the extensions being spaced from each other and symmetrically arranged on the back of arm.

28. The device of claim 27 wherein the counterweight extends between the two extensions.

29. The device of claim 28 wherein the counterweight includes two openings for eccentric receipt of the two extensions.

30. A shrink wrap sealing system for sealing plastic wrap around an item, the system comprising;
    a base unit part;
    components part in the base unit part for controlling and powering the system;
    a hot sealing arm part for sealing a first layer of plastic wrap and a second layer of plastic wrap together, the sealing arm part being operable with the components part and associated with the base unit part such that by placing the plastic wrap between the sealing arm part and the base unit part, the first layer is sealed to the second layer in the area of the hot sealing arm part, the system having a configuration for detachable connection to the system of at least one part.

31. The system of claim 30 wherein the configuration for detachable connection comprises preformed openings.

32. The system of claim 31 wherein the one part is a conveyor.

33. The system of claim 31 wherein the one part is an electric hole punch.

34. The system of claim 31 wherein the one part is a scissor jack.

35. The system of claim 31 wherein the one part is a plastic feeder.

36. The system of claim 31 wherein the one part is a magnetic sealing device.

37. The system of claim 31 wherein the one part is a pneumatic sealing device.

38. The system of claim 31 wherein the hot sealing arm part and the components part are two parts of the at least one part detachably connected to the system.

39. The system of claim 31 wherein the components part is the one part detachably connected to the system.

40. The system of claim 30 wherein the one part is a conveyor, the conveyor being also detachably connected to the components part.

41. The system of claim 30 wherein the one part is an electric hole punch.

42. The system of claim 30 wherein the one part is a scissor jack.

43. The system of claim 30 wherein the one part is a plastic feeder.

44. The system of claim 30 wherein the one part is a magnetic sealing device which is detachably mounted to the system by bolting and powered by detachable connection to the components part.

45. The system of claim 30 wherein the one part is a pneumatic sealing device which is detachably mounted to the system by bolting and powered by detachable connection to the components part.

46. The system of claim 30 wherein the hot sealing arm part and the components part in the base unit for controlling and powering the system are two parts of the at least one part detachably connected to the system.

47. The system of claim 30 wherein the one part is the components part, the components part being detachably connected to the base unit part by bolting.

48. A shrink wrap sealing system for sealing plastic wrap around an item, the system comprising;

a base unit;

components in the base unit for controlling and powering the system;

a hot sealing arm for sealing a first layer of plastic wrap and a second layer of plastic wrap together, the sealing arm being operable with the components and associated with the base unit such that by placing the plastic wrap between the sealing arm and the base unit, the first layer is sealed to the second layer in the area of the hot sealing arm, the system defining preformed openings for connecting at least one part to the system.

49. The system of claim 48 wherein the at least one part is a conveyor.

50. A shrink wrap L-sealer machine for sealing plastic wrap around an item, the machine comprising;

a base unit;

components in the base unit for controlling and powering the machine;

a hot sealing L-shaped sealing frame for sealing a first layer of plastic wrap and a second layer of plastic wrap together, the sealing frame being operable with the components and associated with the base unit such that by placing the plastic wrap between the sealing frame and the base unit, the first layer is sealed to the second layer in the area of the hot sealing frame, the machine defining preformed openings for connecting at least one part to the machine.

51. The machine of claim 50 wherein the at least one part is a conveyor.

52. A machine for sealing plastic wrap around an item, the machine comprising;

a base unit;

components in the base unit for controlling and powering the machine;

a hot sealing frame for sealing a first layer of plastic wrap and a second layer of plastic wrap together, the sealing frame being operable with the components and pivotally attached to the base unit such that by placing the plastic wrap between the sealing frame and the base unit, the first layer is sealed to the second layer in the area of the hot sealing frame, the machine defining preformed openings for connecting at least one part to the machine, the machine being a shrink wrap machine.

53. The machine of claim 52 wherein the at least one part is a conveyor.

54. A sealing system for sealing plastic wrap around an item, the system comprising:

a base unit;

electrical components in the base unit for controlling and powering the system;

an electrically powered hot sealing frame for sealing a first layer of plastic wrap and a second layer of plastic together, the sealing frame being pivotally attached to the base unit and having a back portion and an elongated heated portion extending from the back portion to define a side portion and a front portion, wherein the elongated heated portion contacts the first layer of plastic wrap so that the first layer of plastic wrap melts to the second layer of plastic wrap under the elongated heated portion; the system being detachably connectable by detachable fastening or association to at least one of the following items: an electrically operable scissor jack, an electrically operable plastic feeder, an electrically operable conveyor, the electrically operable scissor jack, electrically operable plastic feeder, and electrically operable conveyor each being operable with the system.

55. The sealing system of claim 54 wherein the electrically operable scissor jack, electrically operable plastic feeder, and electrically operable conveyor each being operable independently of the system, the electrically operable items being detachably connectable to the electrical components.

56. The sealing system of claim 54 wherein the electrically operable scissor jack, electrically operable plastic feeder, and electrically operable conveyor each being detachably connectable to the electrical components.

57. The modular sealing system of claim 8 wherein the system is a shrink wrap machine.

* * * * *